(12) United States Patent
Gewirtz et al.

(10) Patent No.: US 8,051,227 B1
(45) Date of Patent: Nov. 1, 2011

(54) PROGRAMMABLE QUEUE STRUCTURES FOR MULTIPROCESSORS

(75) Inventors: Evan Gewirtz, San Ramon, CA (US); Robert Hathaway, Sunnyvale, CA (US); Stephan Meier, Sunnyvale, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 40 days.

(21) Appl. No.: 12/777,084

(22) Filed: May 10, 2010

(51) Int. Cl.
G06F 3/00 (2006.01)
G06F 13/00 (2006.01)
(52) U.S. Cl. .......................... 710/56; 711/146
(58) Field of Classification Search .............. 710/56; 711/146
See application file for complete search history.

(56) References Cited

U.S. PATENT DOCUMENTS

| | | | | |
|---|---|---|---|---|
| 5,375,223 | A * | 12/1994 | Meyers et al. | 711/151 |
| 7,225,300 | B1 * | 5/2007 | Choquette et al. | 711/146 |
| 2004/0139305 | A1 * | 7/2004 | Arimilli et al. | 712/227 |
| 2004/0225765 | A1 * | 11/2004 | Greer | 710/52 |
| 2005/0160139 | A1 * | 7/2005 | Boucher et al. | 709/203 |

* cited by examiner

Primary Examiner — Henry Tsai
Assistant Examiner — Hyun Nam
(74) Attorney, Agent, or Firm — Blakely Sokoloff Taylor & Zafman, LLP

(57) ABSTRACT

A command is received from a first agent via a first predetermined memory-mapped register, the first agent being one of multiple agents representing software processes, each being executed by one of processor cores of a network processor in a network element. A first queue associated with the command is identified based on the first predetermined memory-mapped register. A pointer is atomically read from a first hardware-based queue state register associated with the first queue. Data is atomically accessed at a memory location of the memory based on the pointer. The pointer stored in the first hardware-based queue state register is atomically updated, including incrementing the pointer of the first hardware-based queue state register, reading a queue size of the queue from a first hardware-based configuration register associated with the first queue, and wrapping around the pointer if the pointer reaches an end of the first queue based on the queue size.

19 Claims, 8 Drawing Sheets

PROGRAMMABLE QUEUE STRUCTURES FOR MULTIPROCESSORS

FIELD OF THE INVENTION

Embodiments of the invention relate generally to the field of multiprocessing; and more particularly, to programmable queues structures for multiprocessors.

BACKGROUND

In a multi-processor system, it is frequently desirable to build queues, or first-in-first-out (FIFO) buffers, in memory. A queue is a data structure with FIFO properties where agents push elements onto the queue (writes) and pop elements off of the queue (reads). This in normally accomplished by allocating storage for the queue elements, and separately allocating storage for the queue state which includes read and write pointers, and any other desired information.

When software wants to read an element from the queue, or write an element to the queue, it first must ensure that it has exclusive and atomic control of the queue element and queue state storage. Then it must update the queue state and access the queue element to perform its operation. Finally, the memory that controls the ownership of the shared memory block must be updated to indicate that the operation is complete. Since there are usually multiple processors using a queue, this requires some forms of data locking of the queue states to ensure that the access to the queue states and the access to the queue element are atomic and consistent. Data locking, and particularly contention over the lock state memory locations, is often a performance-limiting operation in multi-processor systems. In particular, if there are both multiple producers and multiple consumers of queue data, the performance implications can be severe.

SUMMARY OF THE DESCRIPTION

According to one aspect of the invention, a command is received from a first agent via a first predetermined memory-mapped register, the first agent being one of multiple agents representing software processes, each being executed by one of multiple processor cores of a network processor in a network element. A first queue associated with the command is identified based on the first predetermined memory-mapped register, where the first queue was allocated in a memory. A pointer is atomically read from a first hardware-based queue state register associated with the first queue. Data is atomically accessed at a memory location of the memory based on the pointer, the memory location having been allocated as a part of the first queue. The pointer stored in the first hardware-based queue state register is atomically updated, including incrementing, via a first increment/decrement hardware logic, the pointer of the first hardware-based queue state register, reading a queue size of the queue from a first hardware-based configuration register associated with the first queue, and wrapping around, via the first increment/decrement hardware logic, the pointer of the first hardware-based queue state register if the pointer reaches an end of the first queue based on the queue size. As a result, the pointer is obtained and updated atomically through hardware so that the software process represented by the first agent is not required to obtain an exclusive access control of the first queue from the Operating System.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

According to some embodiments, a high performance hardware implementation is employed to manage logical queues with configuration registers which use queue element storage that is allocated in a normal memory. A queue is made up of one or more configuration registers and access registers. One register (also referred to as a configuration register) holds the configuration of the queue and defines its operation. This register may be written by configuration or system software to create a queue in memory, thus the properties of the queue are highly programmable. Once a queue is set up, it can be used concurrently by any number of agents in the system, both producers (e.g., agents to write to the queue) and consumers (e.g., agents to read from the queue).

Another register (also referred to as a state register or status register) holds the dynamic state of the queue, including a read pointer and a write pointer, queue occupancy, and/or number of free writeable entries for flow control purposes. This register may be updated by hardware logic that manages the queues. Software can then perform queue operations by performing simple reads and writes to one or more data access registers (e.g., memory mapped registers). A write operation may cause an element to be pushed onto the tail of the queue and a read operation may cause an element to be popped from the head of the queue. The queue hardware (e.g., address decoder) performs the translation between read and write pointers and memory addresses. All maintenance of the queue state is done automatically in hardware, and will be atomically visible, along with the new queue entry (or the new head of the queue for a pop), to the next access.

Figure 1:
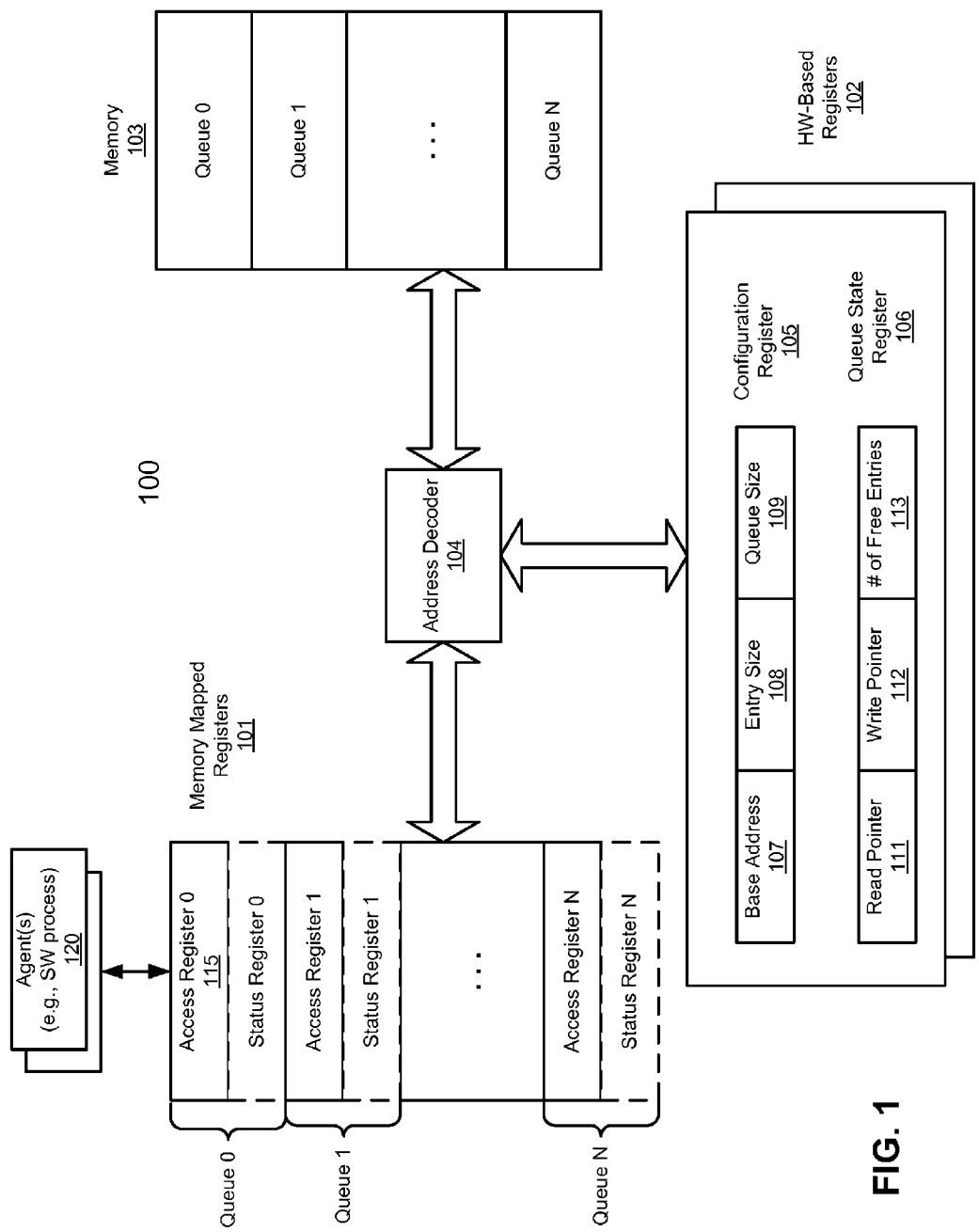
FIG. 1 is a block diagram illustrating a hardware-controlled queuing system according to one embodiment of the invention.

FIG. 1 is a block diagram illustrating a hardware-controlled queuing system according to one embodiment of the invention. Referring to FIG. 1, system 100 includes, but not limited to, one or more memory mapped registers 101, one or more hardware-based registers 102, and a memory or memory section 103 (e.g., part of main memory) defining one or more queues (e.g., logical queues) coupled to each other via an address decoder 104. Memory mapped registers 101 (also referred to as data access registers or simply access registers) include one or more access registers for each queue defined in memory 103.

For each queue, according to one embodiment, there is an access register and a status register. An access register can be used to read and/or write data from and/or to the corresponding queue defined in memory 103. A status register can be used to obtain certain state information (e.g., current queue occupancy) from one or more of hardware-based registers 102 associated with the respective queue. Similarly, for each queue, a set of hardware-based registers are defined and allocated as part of hardware-based registers 102. Memory mapped registers of a particular queue may be mapped and/or translated by address decoder 104 to one or more of hardware-based registers 102 and queue entries defined in memory 103 of the corresponding queue.

According to certain embodiments, system 100 provides a software accessible hardware queuing structure in which all maintenance of the queue state is done automatically in hardware, for example, via address decoder 104 and hardware-based registers 102, as well as their underlying hardware logic. One of the challenges is to provide a simple efficient software access model, at the same time ensuring that all software visible state is atomically visible, including but not limited to new queue entry, empty, full state etc., while enabling coherency between potentially hundreds of independent software clients.

In one embodiment, a programmable queue includes a configuration register 105, a queue state register 106, storage that is allocated for the queue elements (e.g., corresponding memory segment of memory 103), and data access registers (e.g., corresponding memory mapped registers 101). Configuration software can set up a queue by writing the corresponding configuration register 105 and enabling the queue as well as defining its behavior. Once the queue is programmed, any other agent (e.g., agents 120) in the system can read or write (e.g., push or pop) from or to the queue by issuing standard reads and write commands (loads and stores) to the corresponding memory mapped registers 101.

In one embodiment, configuration register 105 defines the operation of the queue including parameters, such as, for example, base memory address 107, element or entry size 108, queue depth 109, and options (e.g., flow control options, processor interrupt options, and prioritization options, etc.) Base memory address 107 is a memory pointer pointing to the beginning of the allocated queue storage. Entry size 108 and queue size 109 define the size of the queue. The flow control option enables a built-in credit counter for each queue. The processor interrupt options enable the queue hardware to generate processor interrupts to a programmable target whenever certain queue events are detected. For example, an interrupt can be generated when a queue goes from empty to non-empty; drains below a predetermined threshold; or fills above a predetermined threshold, etc. The priority option allows queues to be grouped into priority groups, which will be described in details further below.

In one embodiment, state register 106 includes read pointer 111, write pointer 112, a number of occupied entries 113, and available entries for reservation. Read pointer 111 points to a head of a queue for reading a next queue element or data entry. Write pointer 112 points to a tail of the queue for writing new data into the queue. Number of occupied entries 113 includes data representing the number of entries currently stored in the queue. The reservation field can be used to specify the number of entries available for writing into the queue. All fields of state register 106 are maintained by hardware logic, for example, atomically.

When a programmable queue is enabled and defined, according to one embodiment, agents 120 can perform reads and writes to the corresponding data access registers 101, which may cause queue operations to be performed atomically. These accesses may cause the appropriate queue element to be read or written, and the queue state to be updated accordingly by hardware logic. These two operations may appear to be atomic to all agents in the system. For reads, there can be two kinds of data access registers: blocking and non-blocking which have different behaviors when the queue is empty. Non-blocking reads may return a fail value to the requesting agent, whereas blocking reads may be queued in the queue element storage space (e.g., memory 103) in the order that they are received. When an element is subsequently written to the queue, the oldest waiting read return information (i.e. where to return the data) is read from the queue storage and the write data is sent to the agent that made that read.

An atomic operation in computer science refers to a set of operations that can be combined so that they appear to the rest of the system to be a single operation with only two possible outcomes: success or failure. A set of operations can be considered atomic when two conditions are met: 1) until the entire set of operations completes, no other process can know about the changes being made (invisibility); and 2) if any of the operations fail then the entire set of operations fails, and the state of the system is restored to the state it was in before any of the operations began. Most modern processors have instructions which can be used to implement locking and lock-free and wait-free algorithms. The ability to temporarily turn off interrupts, ensuring that the currently running process cannot be context switched. These instructions are used directly by compiler and operating system writers but are also abstracted and exposed as bytecodes and library functions in higher-level languages.

In one embodiment, state register 106 includes an optional built-in credit counter represented by the number of free entries 113 which can be accessed via a status register of memory mapped registers 101 corresponding to the queue. The credit counter originally contains the number of entries in the queue. When an agent wants to write an element into the queue, it first reads the reservation register to see if an entry is available. An agent may be one of multiple agents representing software processes, each being executed by one of multiple processor cores of a network processor in a network element. The queue hardware can return a pass/fail value to the agent in response to the read, depending on whether there is a reservation available, which may be specified via a reserved field (not shown) of state register 106. When an agent receives a pass value, it can perform a write to one of the data access registers. If it receives a fail value, it must attempt to obtain a reservation again. If the agent decides not to write an element on to the queue, the agent may be required to write the reservation register to free the credit for subsequent use. The available reservation count is maintained by hardware: it is decremented when a successful reservation read request is processed, and incremented when either a reservation register write is seen, or when an element is popped off of the queue.

According to one embodiment, when an agent such as agent 120 desires to read data from a specific queue, the agent may specific perform a read operation from an access register associated with the specific queue. For example, if agent 120 desires to read data from queue 0, it may read from access register 115. In response, address decoder 104 may access a set of hardware-based registers associated with the queue being accessed (e.g., hardware-based registers associated with queue 0). In this example, decoder 104 may atomically obtain a read pointer 111 from queue state register 106 associated with the queue being accessed. In addition, decoder 104 may obtain base address 107 and entry size 108 from configuration register 105 associated with the queue being accessed. A memory address for the entry to be read is determined based on the read pointer 111, base address 107, and entry size 108. In one embodiment, the memory address of the entry being read can be determined as follows:

Memory address=Base Address+(Read Pointer*Entry Size)

where (Read Pointer*Entry Size) represents an offset from the base address.

The memory address is used to read data from the corresponding queue in memory 103. Thereafter, read pointer 111 may be atomically updated via hardware logic (e.g., decoder 104), for example, by incrementing or decrementing read pointer 111 dependent upon the specific implementation of the queue. When read pointer 111 is updated, in this example, being incremented, hardware logic may also determine whether read pointer 111 has reached the bottom or top of the queue, based on base address 107 and queue size 109 obtained from configuration register 105. If read pointer 111 does reach the top or bottom of the queue, read pointer 111 may be wrapped around or reset to a predetermined value such as zero. In addition, the number of free entries field 113 may also be updated by hardware logic, for example, by incrementing field 113, since an entry has been popped from the queue. These operations are performed atomically and controlled by hardware logic or logics. As a result, the agent does not have to worry about the exclusive access to the queues. It will be appreciated that certain firmware or low level software may also be utilized in conjunction with hardware logics.

According to one embodiment, when an agent such as agent 120 desires to write data to a specific queue, the agent may specific perform a write operation to an access register associated with the specific queue. For example, if agent 120 desires to write data to queue 0, it may write data to access register 115. In response, address decoder 104 may access a set of hardware-based registers associated with the queue being accessed (e.g., hardware-based registers associated with queue 0). In this example, decoder 104 may atomically obtain a write pointer 112 from queue state register 106 associated with the queue being accessed. In addition, decoder 104 may obtain base address 107 and entry size 108 from configuration register 105 associated with the queue being accessed. A memory address for the entry to be written is determined based on the write pointer 112, base address 107, and entry size 108. In one embodiment, the memory address of the entry being written can be determined as follows:

Memory address=Base Address+(Write Pointer*Entry Size)

where (Write Pointer*Entry Size) represents an offset from the base address.

The memory address is used to write data to the corresponding queue in memory 103. Thereafter, write pointer 112 may be atomically updated via hardware logic (e.g., decoder 104), for example, by incrementing or decrementing write pointer 112 dependent upon the specific implementation of the queue. When write pointer 112 is updated, in this example, being incremented, hardware logic may also determine whether write pointer 112 has reached the bottom or top of the queue, based on base address 107 and queue size 109 obtained from configuration register 105. If write pointer 112 does reach the top or bottom of the queue, write pointer 112 may be wrapped around or reset to a predetermined value such as zero. In addition, the number of free entries field 113 may also be updated by hardware logic, for example, by decrementing field 113, since an entry has been pushed into the queue. These operations are performed atomically and controlled by hardware logic. As a result, the agent does not have to worry about exclusive access to the queues. Again, it will be appreciated that certain firmware or low level software may also be utilized in conjunction with hardware logic.

Figure 2:
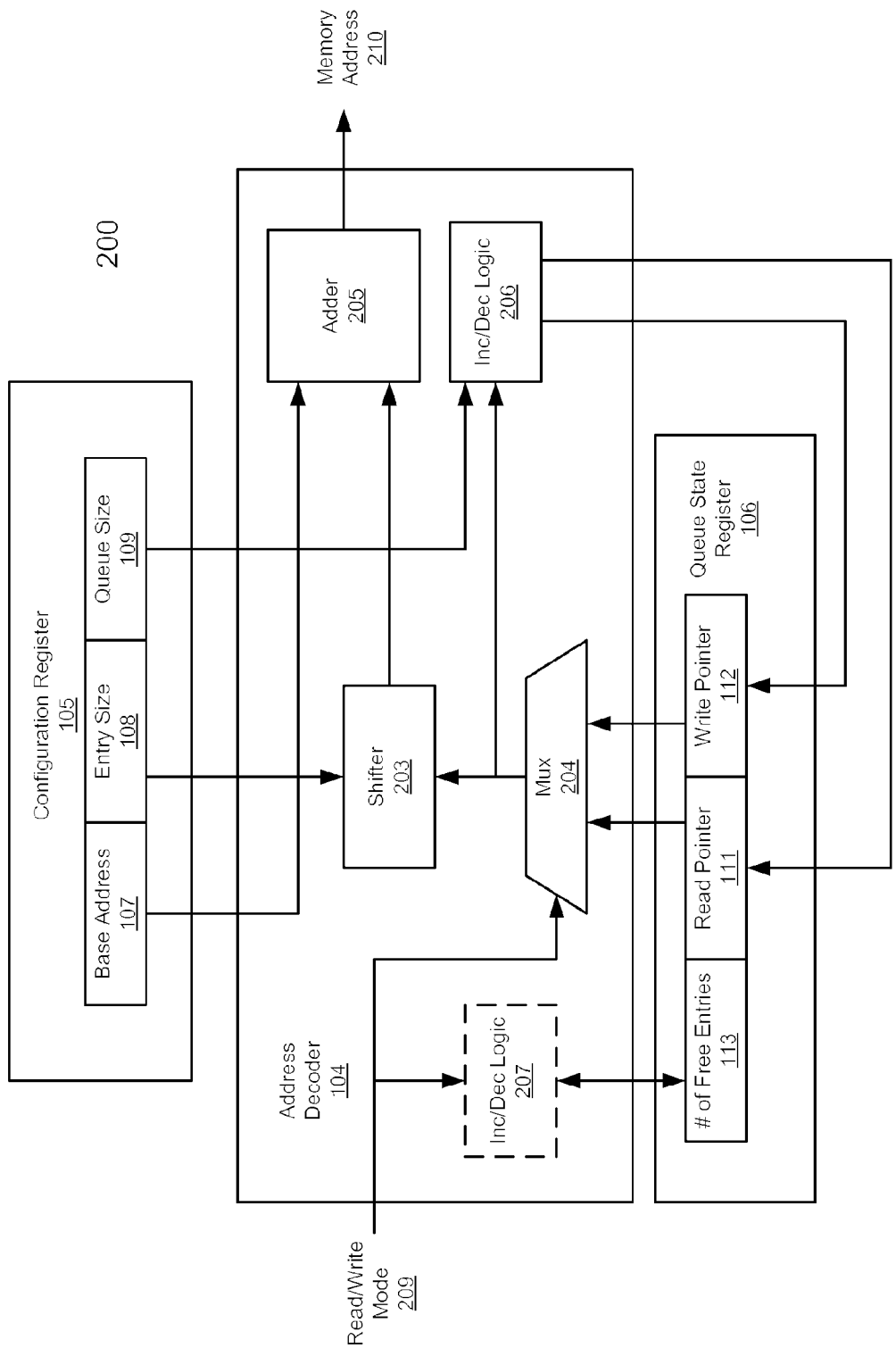
FIG. 2 is a block diagram illustrating a hardware-based queue implementation according to one embodiment of the invention.

FIG. 2 is a block diagram illustrating a hardware-based queue implementation according to one embodiment of the invention. For example, queue 200 may be implemented as part of system 100 of FIG. 1. Referring to FIG. 2, queue 200 includes configuration register 105 of all queues, which may be stored in a control random access memory (RAM) and queue state register 106 of all queues, which may be stored in a status RAM. In addition, system 200 includes the address decoder 104 having shifter 203, multiplexer 204, adder 205, and increment/decrement logics 206-207.

In one embodiment, when a command or request for accessing a queue is received, for example, via a predetermined memory mapped register associated with the queue, a signal (not shown) which is derived from the predetermined memory mapped register is used to identify the corresponding set of configuration register 105 and queue state register 106. In addition, signal 209 is also derived from the request indicating whether the access is a read or write access. Based on signal 209, multiplexer is configured to select either a read pointer 111 or write pointer 112 from queue state register 106 which is selected based on the signal based on the corresponding memory-mapped register. The selected read or write pointer is then multiplied by queue size 108 via shifter 203, forming an offset. The output of shifter 203 representing the offset is added to base address 107 via adder 205 to form a final memory address 210. Memory address 210 may be used to access a specific entry of the queue.

Further, the number of free entries 113 of the queue is updated via increment/decrement logic 207. Either read pointer 111 or write pointer 112 may also be updated via increment/decrement logic 206 based on queue size 109, dependent upon whether the access is a read or write access which is obtained from the output of multiplexer 204.

Note that for purpose of illustration, system 200 represents one queue. It will be appreciated that multiple queues, each having a separate set of configurations register 105 and queue state register 106, may also be applied, while certain components such as shifter 203, multiplexer 204, adder 205, and/or increment/decrement logic 206-207 may or may not be shared among multiple queues.

One of the advantages of the programmable queue as shown in FIGS. 1-2 is that, once defined, system agents can perform normal read and write commands that are processed atomically as pushes and pops from that queue. This reduces the latency seen when reading from the queue and, even more importantly, eliminates the need for a locking access to gain exclusive ownership of the memory holding all of the queue data. This avoids contention over the lock. Memory contention over shared memory space is always detrimental to multi-processor system performance. In addition to the atomicity and locking benefits, the queues are extremely flexible, and can include a variety of optional features. They can be defined to have a large range of depths and element sizes. They can have built-in credit counters (e.g., represented by the number of free entries of a queue state register) to assist with system flow control. They can generate processor interrupts when their state changes to assist with message passing and resource management. They can be accessed with blocking and non-blocking reads depending on the desired behavior when an agent tries to read an empty queue. Finally, they can be organized into priority groups to assist in the processing of certain kinds of workloads.

Figure 3:
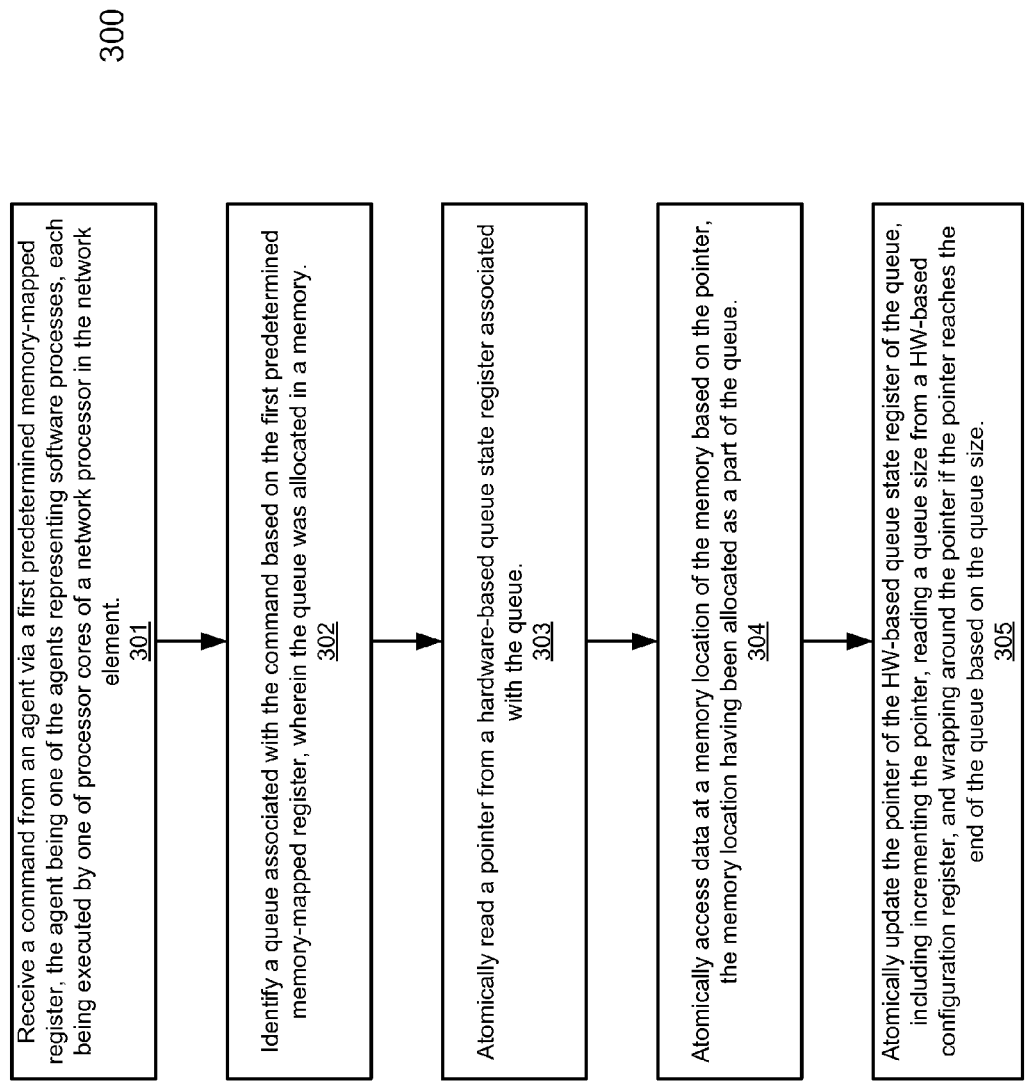
FIG. 3 is a flow diagram illustrating a method for access a queue controlled by hardware logic according to one embodiment of the invention.

FIG. 3 is a flow diagram illustrating a method for access a queue controlled by hardware logic according to one embodiment of the invention. Note that method 300 may be performed by processing logic which may include hardware, firmware, software, or a combination there of. For example, method 300 may be performed by systems as shown in FIGS. 1 and/or 2. Referring to FIG. 3, at block 301, a command (e.g., a memory access command, such as a read command or a write command) is received from an agent via a predetermined memory mapped register (e.g., data access register). The agent may be one of the software processes, each being executed by one of multiple processor cores of a network processor of a network element. At block 302, a queue is identified based on the predetermined memory mapped register, where the queue has been allocated in a memory. At block 303, a pointer of the queue is atomically read from a hardware-based queue state register associated with the queue. At block 304, data is accessed (e.g., read or write) at a memory location of a memory based on the pointer, where the memory location is allocated as a part of the queue. In one embodiment, a base address is obtained from a hardware-based configuration register of the queue, where the configuration register is configured by system software prior to being used. A memory address is generated via hardware logic based on the pointer and the base address. The data is accessed at the memory location based on the memory address. Thereafter, at block 305, the pointer of the HW-based queue state register of the queue is updated atomically, including incrementing the pointer, reading a queue size from a HW-based configuration register, and wrapping around the pointer if the pointer reaches the end of the queue based on the queue size. In addition, the number of free entries of the queue may also be updated.

Figure 4A:
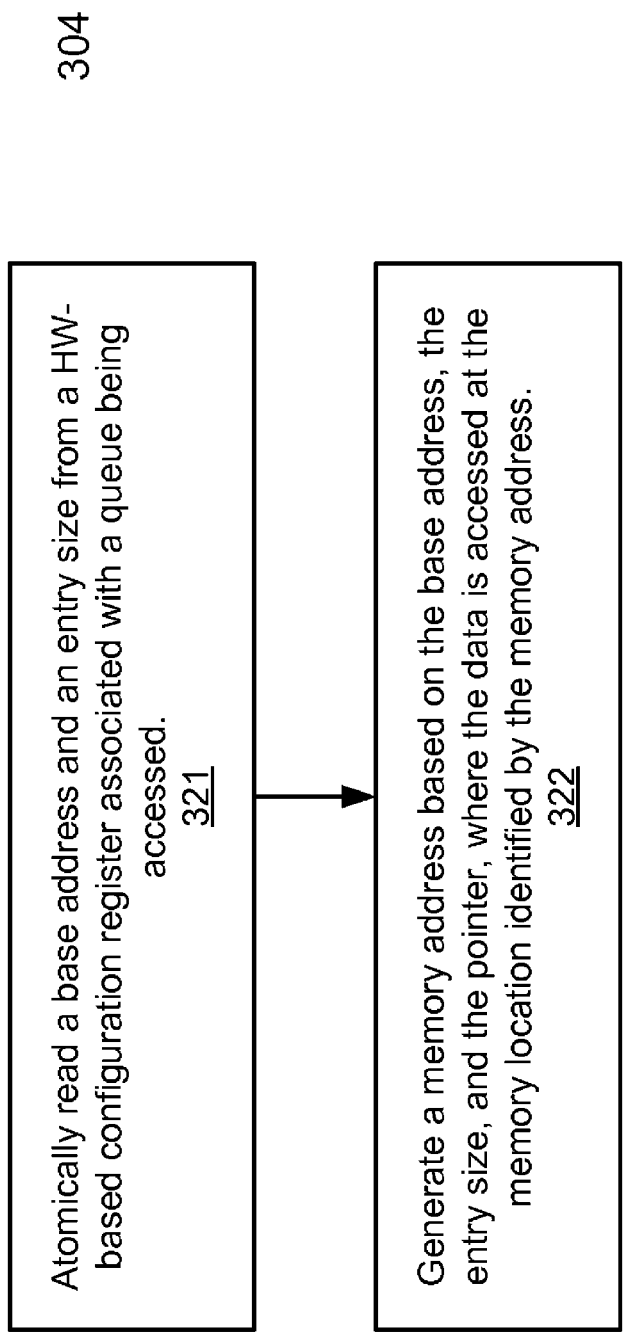
FIGS. 4A-4B are flow diagrams illustrating a method for access a queue controlled by hardware logic according to some embodiments of the invention.

FIG. 4A is a flow diagram illustrating a method for access a queue controlled by hardware logic according to another embodiment of the invention. For example, method 320 may be performed as part of blocks 302-304 of FIG. 3. Referring to FIG. 4A, at block 321, a base address and an entry size are atomically obtained from a HW-based configuration register associated with a queue being accessed. At block 322, a memory address is determined based on the base address, the entry size, and the pointer, where the data is accessed at the memory location identified by the memory address.

Figure 4B:
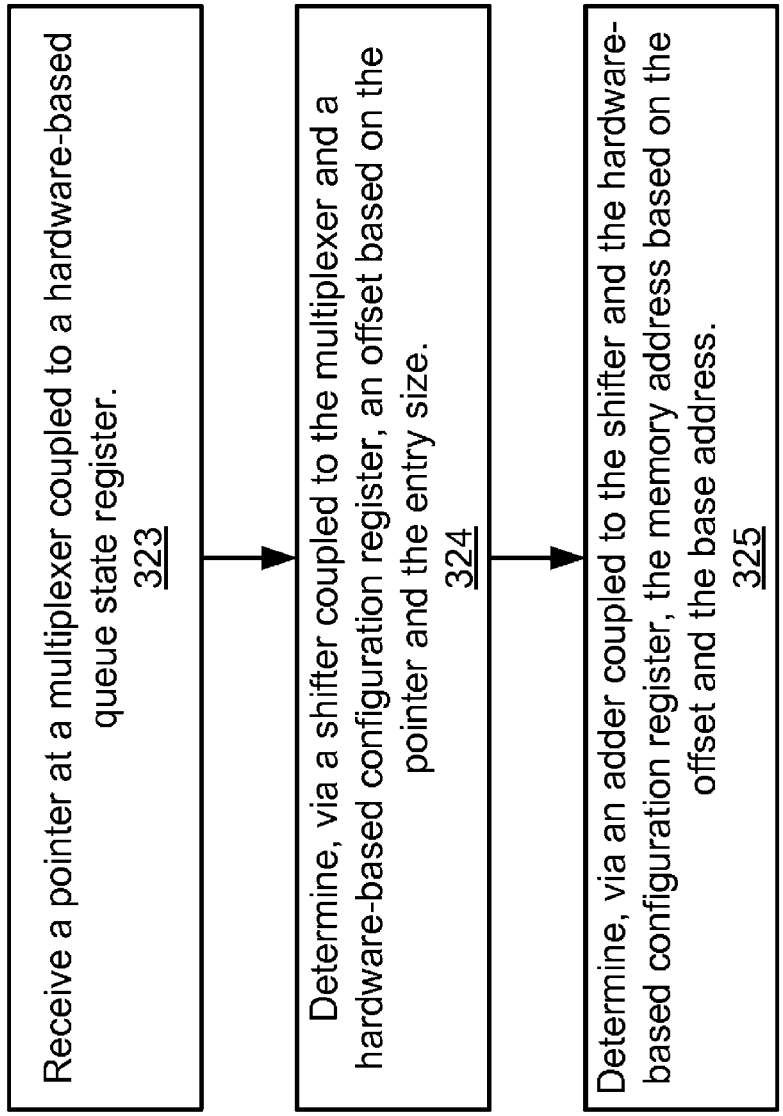

FIG. 4B is a flow diagram illustrating a method for access a queue controlled by hardware logic according to another embodiment of the invention. Referring to FIG. 4B, at block 323, a pointer is received at a multiplexer coupled to a hardware-based queue state register. At block 324, it is determined, via a shifter coupled to the multiplexer and a hardware-based configuration register, an offset based on the pointer and the entry size. At block 325, via an adder coupled to the shifter and the hardware-based configuration register, the memory address based on the offset and the base address.

According to another embodiment, the queue structure described above may also have the ability to group a number queues into one or more priority groups. In this mode, a priority group of queues is defined which have a priority relationship between them. Writes to a queue are targeted to a particular queue (i.e. the writing agent may specify the priority of the access when it performs the write). When a read is performed to the appropriate access register, the queue hardware can scan all of the queues in the priority group and return the element at the head of the highest priority queue that is non-empty.

Figure 5:
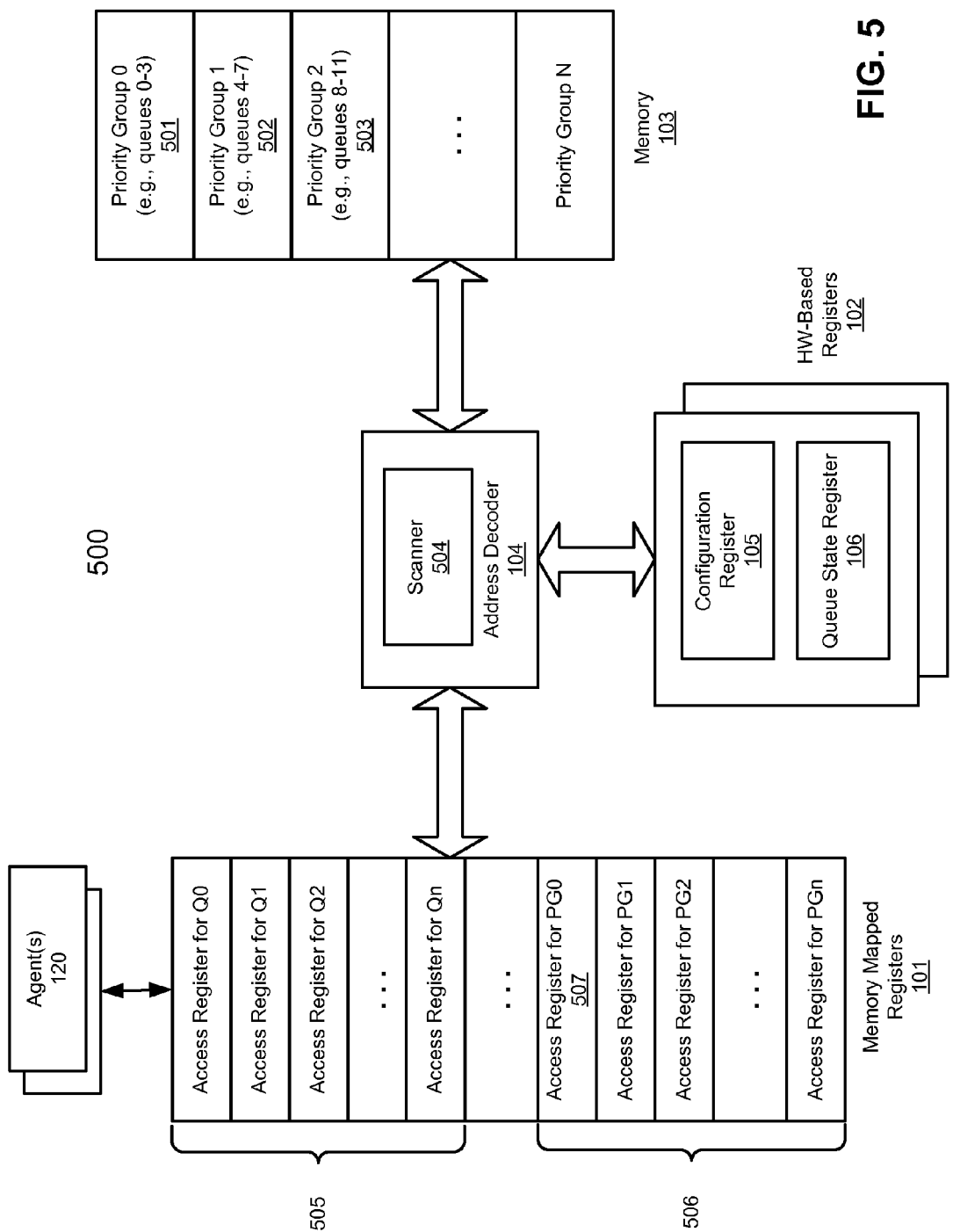
FIG. 5 is a block diagram illustrating a queue system according to another embodiment of the invention.

FIG. 5 is a block diagram illustrating a queue system according to another embodiment of the invention. Referring to FIG. 5, similar to system 100 of FIG. 1, system 500 includes a set of memory mapped registers 101 as part of data access registers, one or more sets of hardware-based registers 102 each having a configuration register 105 and queue state register 106 which corresponds to a queue defined in memory 103, and address decoder 104 for decode or interpret memory address based on information received from data access registers 101 and hardware-based registers 102 for accessing one or more queues defined in memory 103, as described above. For illustration purpose, certain reference numbers are maintained identical for certain components having similar or identical functionalities with respect to those in FIG. 1.

In addition, according to one embodiment, data access registers 101 include a set of data access registers 505 for accessing individual queue and data access registers 506 for accessing a priority group of queues. Queues defined in memory 103 by system software may be grouped into one or more priority groups. For example, queues 0-3 may be grouped into priority group 501; queues 4-7 may be grouped into priority group 502; queues 8-11 may be grouped into priority group 503, etc. Agent 120 can access an individual queue by one of accessing data access registers 505. Agent 120 can also access a priority group by accessing one of data access registers 506.

In one embodiment, when data is written into a queue via data access registers 506, a priority associated with the data may also be specified. When data is read from a priority group via data access registers 506, the priority of the read access is determined based on which one of data access registers 506 is used. Based on the priority, scanner 504 can scan all queues that are associated with the determined priority to identify a queue that is not empty and has the highest priority that at least satisfies the determined priority. The top entry of the identified queue is then read (e.g., popped) from the queue. For example, if agent 120 reads from data access register 507 for priority group zero, scanner 504 is configured to scan all queues (e.g., queues 0-3) associated with priority group 501 to identify a non-empty queue having the highest priority and to read the top entry from the identified queue.

Figure 6:
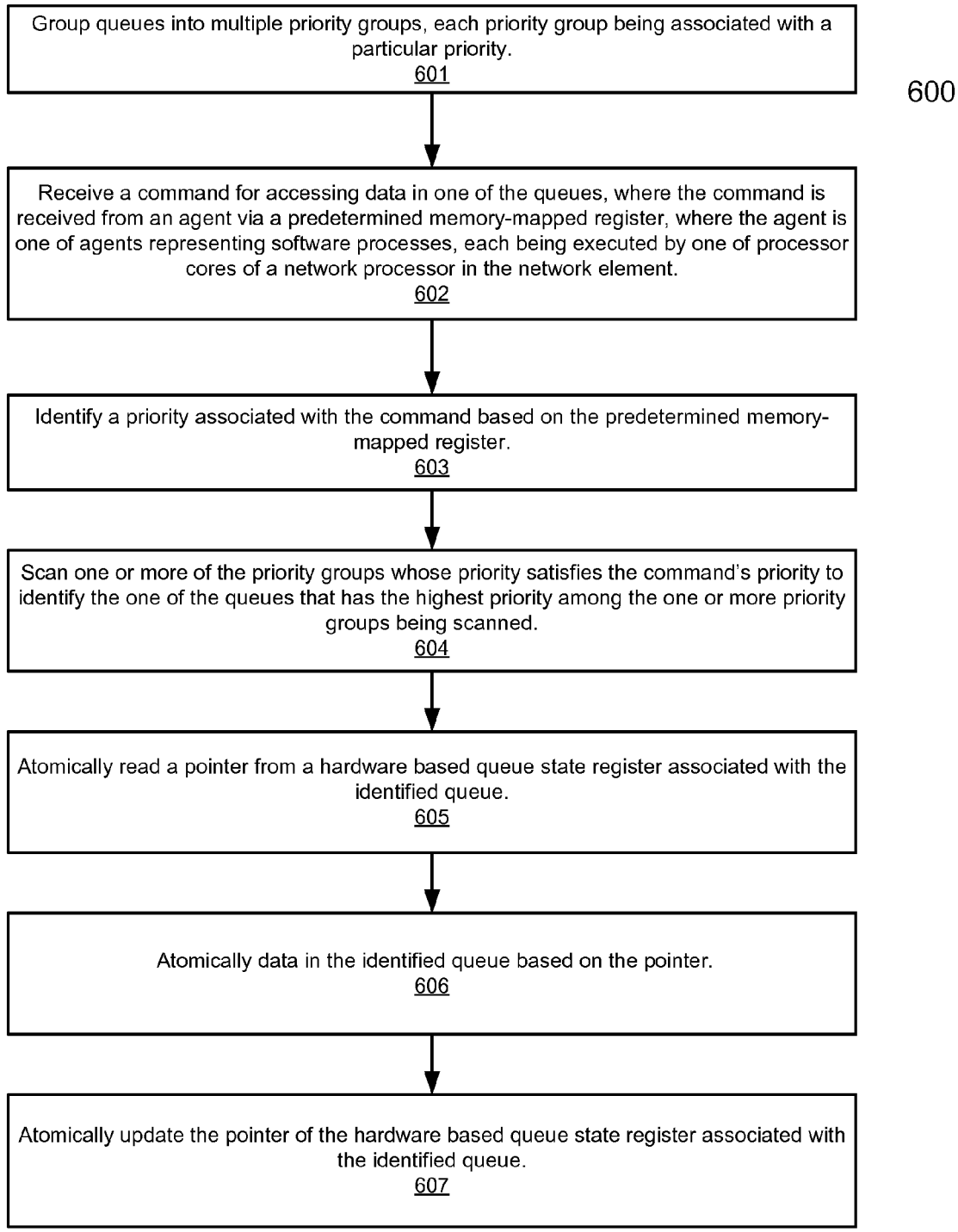
FIG. 6 is a flow diagram illustrating a method for access a queue controlled by hardware logic according to another embodiment of the invention.

FIG. 6 is a flow diagram illustrating a method for accessing a queue according to another embodiment of the invention. Note that method 600 may be performed by processing logic which may include hardware, firmware, software, or a combination there of. For example, method 600 may be performed by system 500 of FIG. 5. Referring to FIG. 6, at block 601, multiple queues are grouped into one or more priority groups, each having a particular (e.g., different) priority. For example, the queues are grouped by system software when configuring the queues, for example, by an option field (not shown) in the corresponding hardware-based queue configuration register 105 or hardware-based queue state register 106. At block 602, a command or request is received from an agent for accessing data in one of the queues via a predetermined memory-mapped register. The agent may be one of multiple agents, each being executed by one of processor cores of a network processor of a network element. At block 603, a priority associated with the command is identified based on the predetermined memory-mapped register. At block 604, processing logic scans one or more of the priority groups whose priority satisfies the command's priority to identify the one of the queues that has the highest priority among the one or more priority groups being scanned. At block 605, a pointer is atomically read from a hardware based queue state register associated with the identified queue. At block 606, data is accessed in the identified queue based on the pointer. Thereafter, at block 607, the pointer of the hardware-based queue state register associated with the identified queue is atomically updated. In addition, the number of free entries may also be updated.

Figure 7:
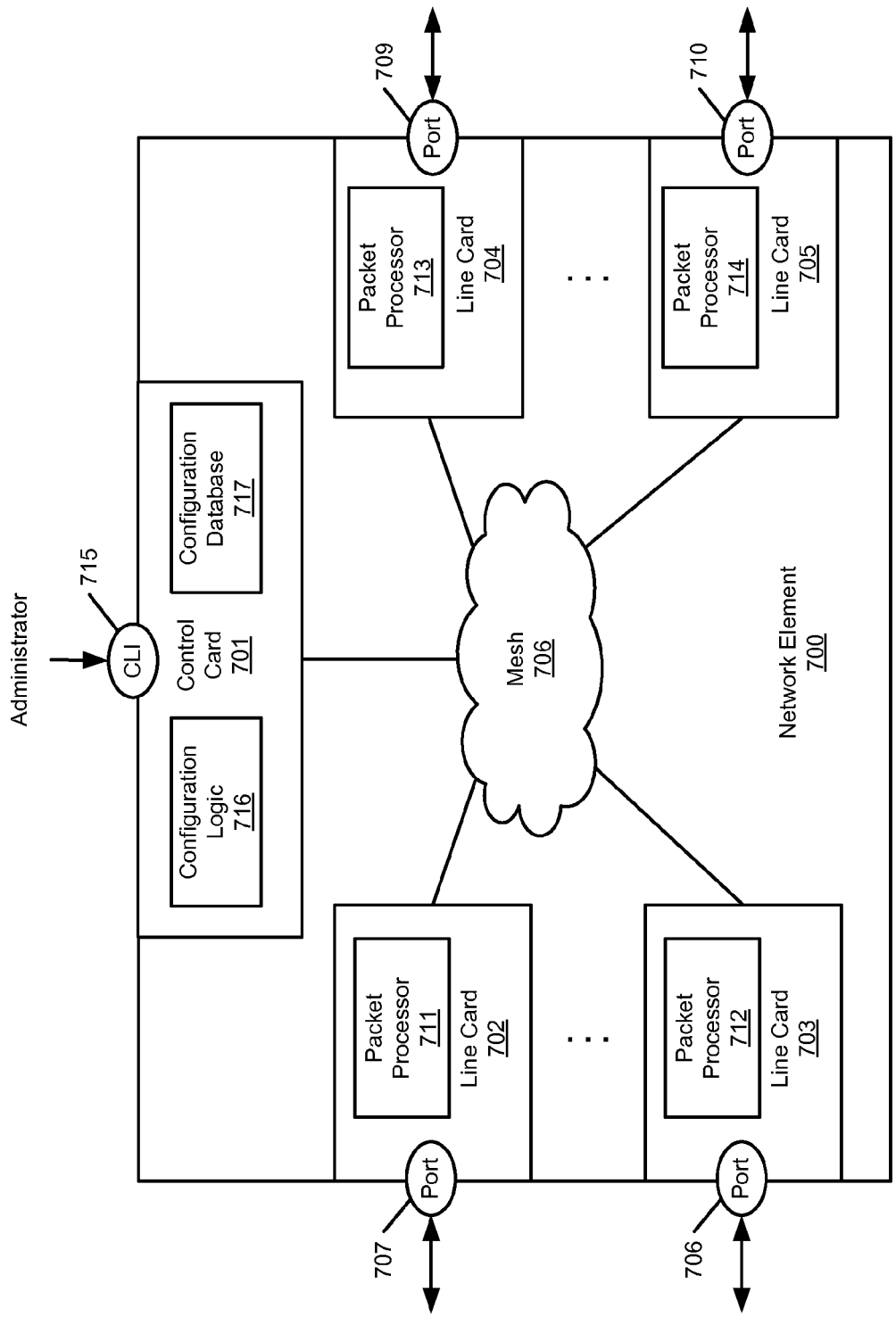
FIG. 7 is a block diagram illustrating a network element according to one embodiment of the invention.

FIG. 7 is a block diagram illustrating a network element according to one embodiment of the invention. Network element 700 may be implemented as any network element having queue systems as shown in FIGS. 1-2 and 5. For example, at least one of the line cards 702-705 may include a queue system as described above. Referring to FIG. 7, network element 700 includes, but is not limited to, a control card 701 (also referred to as a control plane) communicatively coupled to one or more line cards 702-705 (also referred to as interface cards or user planes) over a mesh 706, which may be a mesh network, an interconnect, a bus, or a combination thereof. A line card is also referred to as a data plane (sometimes referred to as a forwarding plane or a media plane). Each of the line cards 702-705 is associated with one or more interfaces (also referred to as ports), such as interfaces 707-710 respectively. Each line card includes a packet processor, routing functional block or logic (e.g., blocks 711-714) to route and/or forward packets via the corresponding interface according to a configuration (e.g., routing table) configured by control card 701, which may be configured by an administrator via an interface 715 (e.g., a command line interface or CLI). According to one embodiment, control card 701 includes, but is not limited to, configuration logic 716 and database 717 for storing information configured by configuration logic 716.

Referring back to FIG. 7, in the case that network element 700 is a router (or is implementing routing functionality), control plane 701 typically determines how data (e.g., packets) is to be routed (e.g., the next hop for the data and the outgoing port for that data), and the data plane (e.g., lines cards 702-703) is in charge of forwarding that data. For example, control plane 701 typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS), etc.), Label Distribution Protocol (LDP), Resource Reservation Protocol (RSVP), etc.) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures, etc.) on the control plane (e.g., database 708). Control plane 701 programs the data plane (e.g., line cards 702-703) with information (e.g., adjacency and route information) based on the routing structure(s). For example, control plane 701 programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main routing information base (RIB) based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols. For layer 2 forwarding, the network element 700 can store one or more bridging tables that are used to forward data based on the layer 2 information in this data.

Typically, a network element may include a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway), etc.). By way of example, a service card may be used to terminate IPsec tunnels and execute the attendant authentication and encryption algorithms. As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video).

Subscriber end stations (e.g., servers, workstations, laptops, palm tops, mobile phones, smart phones, multimedia phones, Voice Over Internet Protocol (VOIP) phones, portable media players, global positioning system (GPS) units, gaming systems, set-top boxes, etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public Web pages (free content, store fronts, search services, etc.), private Web pages (e.g., username/password accessed Web pages providing email services, etc.), corporate networks over VPNs, etc. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Note that network element 700 is described for the purpose of illustration only. More or fewer components may be implemented dependent upon a specific application. For example, although a single control card is shown, multiple control cards may be implemented, for example, for the purpose of redundancy. Similarly, multiple line cards may also be implemented on each of the ingress and egress interfaces. Also note that some or all of the components as shown in FIG. 7 may be implemented in hardware, software, or a combination of both.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method performed in a network element for accessing queues, the method comprising the steps of:
   receiving a command from an agent via a first predetermined memory-mapped register, the agent being one of a plurality of agents representing a plurality of software processes, each being executed by one of a plurality of processor cores of a network processor in the network element;
   identifying a queue associated with the command based on the first predetermined memory-mapped register, wherein the queue was allocated in a memory;
   atomically reading a pointer from a hardware-based queue state register associated with the queue;
   atomically accessing data at a memory location of the memory based on the pointer, the memory location having been allocated as a part of the queue; and
   atomically updating the pointer stored in the hardware-based queue state register, including incrementing, via a first increment/decrement hardware logic, the pointer of the hardware-based queue state register,
   reading a queue size of the queue from a hardware-based configuration register associated with the queue, and
   wrapping around, via the first increment/decrement hardware logic, the pointer of the hardware-based queue state register if the pointer reaches an end of the queue based on the queue size, and
   whereby the pointer is obtained and updated atomically through hardware so that the software process represented by the agent is not required to obtain an exclusive access control of the queue from an Operating System.

2. The method of claim 1, wherein the step of atomically accessing data at a memory location of the memory comprises:
   atomically reading a base address and an entry size from the hardware-based configuration register; and
   generating a memory address based on the base address, the entry size, and the pointer associated with the queue, wherein the data is accessed at the memory location identified by the memory address.

3. The method of claim 2, wherein the step of generating the memory address comprises:
   receiving the pointer at a multiplexer coupled to the hardware-based queue state register;
   determining, via a shifter coupled to the multiplexer and the hardware-based configuration register, an offset based on the pointer and the entry size; and
   determining, via an adder coupled to the shifter and the hardware-based configuration register, the memory address based on the offset and the base address.

4. The method of claim 1, wherein the step of atomically updating the pointer of the hardware-based queue state register further comprises atomically updating, via a second increment/decrement hardware logic, a number of free entries of the queue in the hardware-based queue state register.

5. The method of claim 4, further comprising:
   receiving a second command from the agent to query a status of the queue via a second predetermined memory-mapped register; and in response to the second command, returning to the agent the status of the queue including the number of free entries of the queue from the hardware-based queue state register.

6. The method of claim 1, wherein the command is a read command to read data from the first queue, wherein the pointer is a read pointer associated with the first queue, and wherein the step of atomically accessing data at the memory location of the memory comprises retrieving the data from the memory location based on the read pointer.

7. The method of claim 1, wherein the command is a write command to write data to the first queue, wherein the pointer is a write pointer associated with the first queue, and wherein the step of atomically accessing data at the memory location of the memory comprises writing the data to the memory location based on the write pointer.

8. A hardware controlled queuing system in a network element for accessing an external memory based queue, the hardware controlled queuing system comprising:
  a first memory-mapped register to receive a read command to access the external memory based queue from a first agent, the first agent being one of a plurality of agents representing a plurality of software processes, each being executed by one of a plurality of processor cores of a network processor in the network element;
  a hardware-based queue state register associated with the queue;
  a hardware-based configuration register associated with the queue;
  a hardware address decoder coupled to the hardware-based queue state register and the hardware-based configuration register, wherein the hardware address decoder comprises:
    a multiplexer coupled to the hardware-based queue state register, in response to the read command, to atomically obtain a read pointer from the hardware-based queue state register,
    a shifter coupled to the multiplexer and the hardware-based configuration register to determine a first offset based on the read pointer and an entry size obtained from the hardware-based configuration register,
    an adder coupled to the shifter and the hardware-based configuration register to determine a first memory address based on the first offset and a base address obtained from the hardware-based configuration register, wherein the data is retrieved from the first memory location having been allocated as a part of the queue based on the first memory address, and
    a first increment/decrement hardware logic configured to atomically update the read pointer of the hardware-based queue state register, wherein the first increment/decrement hardware logic is configured to increment the read pointer, to read a queue size from the hardware-based configuration register, and to wrap around the read pointer if the read pointer reaches an end of the queue based on the queue size,
  whereby the read pointer is obtained and updated atomically through the hardware address decoder so that the software process represented by the first agent is not required to obtain an exclusive access control of the queue from an Operating System.

9. The system of claim 8, wherein the hardware address decoder further comprises a second increment/decrement hardware logic to increment a number of free entries of the queue in the hardware-based queue state register in response to the read command.

10. The system of claim 9, wherein in response to a write command received from a second of the agents via the memory mapped register, the multiplexer is to obtain a write pointer from the hardware-based queue state register, wherein data associated with the write command is written to a second memory location based on the write pointer, wherein the first increment/decrement hardware logic is to atomically increment the write pointer of the hardware-based queue state register.

11. The system of claim 10, wherein the shifter is to determine a second offset based on the write pointer and the entry size obtained from the hardware-based configuration register, wherein the adder is to determine a second memory address based on the second offset and the base address obtained from the hardware-based configuration register, and wherein the data is written to the second memory location based on the second memory address.

12. The system of claim 11, wherein the first increment/decrement hardware logic is adapted to obtain the queue size from the hardware-based configuration register and to wrap around the write pointer of the hardware-based queue state register if the write pointer reaches the end of the queue based on the queue size.

13. The system of claim 12, wherein the second increment/decrement hardware logic is adapted to decrement the number of free entries of the queue in the hardware-based queue state register in response to the write command.

14. The system of claim 13, further comprising a second memory-mapped register to receive a query command to retrieve a status of the queue including the number of free entries of the queue.

15. A method performed in a network element for accessing queues, the method comprising the steps of:
  grouping a plurality of queues into a plurality of priority groups, each priority group being associated with a particular priority;
  receiving a command for accessing data in one of the plurality of queues, wherein the command is received from an agent via a predetermined memory mapped register, wherein the agent is one of a plurality of agents representing a plurality of software processes, each being executed by one of a plurality of processor cores of a network processor in the network element;
  identifying a priority associated with the command based on the predetermined memory-mapped register;
  scanning one or more of the priority groups whose priority satisfies the command's priority to identify the one of the queues that has the highest priority among the one or more priority groups being scanned;
  atomically reading a pointer from a hardware based queue state register associated with the identified queue;
  atomically accessing data in the identified queue based on the pointer; and
  atomically updating the pointer of the hardware based queue state register associated with the identified queue, whereby the pointer is obtained and updated atomically through hardware so that the software process represented by the agent is not required to obtain an exclusive access control of the queue from an Operating System.

16. The method of claim 15, wherein the step of atomically updating the pointer of the hardware based queue state register comprises:
  incrementing, via an increment/decrement hardware logic, the pointer of the hardware-based queue state register;
  reading a queue size of the identified queue from a hardware-based configuration register associated with the identified queue; and wrapping around, via the increment/decrement hardware logic, the pointer of the hardware-based queue state register if the pointer reaches an end of the identified queue based on the queue size.

17. The method of claim 15, wherein the step of atomically accessing data in the identified queue based on the pointer comprises:
   reading a base address and an entry size from the hardware-based configuration register associated with the identified queue; and
   generating a memory address based on the base address, the entry size, and the pointer associated with the identified queue, wherein the data is accessed at a memory location identified by the memory address.

18. The method of claim 15, wherein the command is a read command to read data from the identified queue, wherein the pointer is a read pointer associated with the identified queue, and wherein the step of atomically accessing data in the identified queue based on the pointer comprises retrieving the data from the identified queue based on the read pointer.

19. The method of claim 15, wherein the command is a write command to write data to the identified queue, wherein the pointer is a write pointer associated with the identified queue, and wherein the step of atomically accessing data in the identified queue based on the pointer comprises writing the data to the identified queue based on the write pointer.

* * * * *